United States Patent
Bower, III et al.

(10) Patent No.: US 10,819,795 B2
(45) Date of Patent: Oct. 27, 2020

(54) TRANSMITTING PRINCIPAL COMPONENTS OF SENSOR DATA THAT ARE RESPONSIVE TO A CONTINUOUS QUERY

(71) Applicant: Lenovo Enterprise Solutions (Singapore) Pte. Ltd., Singapore (SG)

(72) Inventors: Fred Allison Bower, III, Durham, NC (US); David Joseph Doria, Raleigh, NC (US); Gregory B. Pruett, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 110 days.

(21) Appl. No.: 15/963,688

(22) Filed: Apr. 26, 2018

(65) Prior Publication Data

US 2019/0334994 A1    Oct. 31, 2019

(51) Int. Cl.
```
G06F 11/30      (2006.01)
H04L 29/08      (2006.01)
H04Q 9/00       (2006.01)
H04L 12/26      (2006.01)
G06F 16/2455    (2019.01)
```

(52) U.S. Cl.
CPC ............ H04L 67/12 (2013.01); G06F 11/30 (2013.01); G06F 11/3089 (2013.01); G06F 16/24568 (2019.01); H04L 43/08 (2013.01); H04Q 9/00 (2013.01); G06F 11/3072 (2013.01); H04Q 2209/70 (2013.01)

(58) Field of Classification Search
CPC .. G06F 11/30; G06F 11/3006; G06F 11/3068; G06F 11/3089; G06F 11/3072; H04L 67/12
See application file for complete search history.

(56) References Cited

U.S. PATENT DOCUMENTS

| | | | |
|---|---|---|---|
| 7,197,370 B1* | 3/2007 | Ryskoski | G05B 19/4183 700/108 |
| 10,298,505 B1* | 5/2019 | Grant | H04W 4/38 |
| 2009/0006158 A1* | 1/2009 | Tsuji | G06Q 10/00 705/7.11 |
| 2016/0072893 A1* | 3/2016 | Suzuki | H04L 12/46 709/224 |
| 2018/0011689 A1* | 1/2018 | Motamedi | A61B 5/167 |
| 2018/0188284 A1* | 7/2018 | Douglas | G01P 13/00 |
| 2019/0028782 A1* | 1/2019 | Matsumoto | H04Q 9/00 |
| 2019/0056725 A1* | 2/2019 | Su | G05D 1/0808 |
| 2019/0140906 A1* | 5/2019 | Furuichi | H04L 41/12 |

* cited by examiner

*Primary Examiner* — Jeong S Park
(74) *Attorney, Agent, or Firm* — Jeffrey Streets

(57) ABSTRACT

A computer program product include non-transitory computer readable storage media having program instructions embodied therewith. The program instructions are executable by a processor to receive a continuous query for a user application and receive unfiltered sensor data transmitted over a network from a local compute node that is operatively coupled to a plurality of sensors, wherein the sensor data includes data obtained from the plurality of sensors. The program instructions are further executable by the processor to identify one or more principal components of the sensor data that are responsive to the continuous query, instruct the local compute node to continue transmitting only the sensor data that has been identified as the one or more principal components, and provide the user application with the sensor data that has been identified as the one or more principal components.

19 Claims, 5 Drawing Sheets

TRANSMITTING PRINCIPAL COMPONENTS OF SENSOR DATA THAT ARE RESPONSIVE TO A CONTINUOUS QUERY

BACKGROUND

The present disclosure relates to the handling and analysis of data from a plurality of sensors.

BACKGROUND OF THE RELATED ART

The amount of sensor data that is being generated by sensors in Internet of Things (IoT) environments is becoming increasingly difficult to manage. The resources required to collect, transmit and analyze all of this data can represent significant capital and operating expenses. While data compression techniques may be used to reduce the volume of data at various points, data compression can only be achieved at the expense of a high computational load for data compression at the source side of the transmission and a similarly high computational load for data decompression at the destination sides of the transmission.

BRIEF SUMMARY

One embodiment provides a computer program product comprising non-transitory computer readable storage media having program instructions embodied therewith. The program instructions are executable by a processor to receive a continuous query for a user application and receive unfiltered sensor data transmitted over a network from a local compute node that is operatively coupled to a plurality of sensors, wherein the sensor data includes data obtained from the plurality of sensors. The program instructions are further executable by the processor to identify one or more principal components of the sensor data that are responsive to the continuous query, instruct the local compute node to continue transmitting only the sensor data that has been identified as the one or more principal components, and provide the user application with the sensor data that has been identified as the one or more principal components.

Another embodiment provides an apparatus comprising at least one storage device for storing program instructions and at least one processor for executing the program instructions. The program instructions are executable by the processor to receive a continuous query for a user application and receive unfiltered sensor data transmitted over a network from a local compute node that is operatively coupled to a plurality of sensors, wherein the sensor data includes data obtained from the plurality of sensors. The program instructions are further executable by the processor to identify one or more principal components of the sensor data that are responsive to the continuous query, instruct the local compute node to continue transmitting only the sensor data that has been identified as the one or more principal components, and provide the user application with the sensor data that has been identified as the one or more principal components.

DETAILED DESCRIPTION

Figure 1:
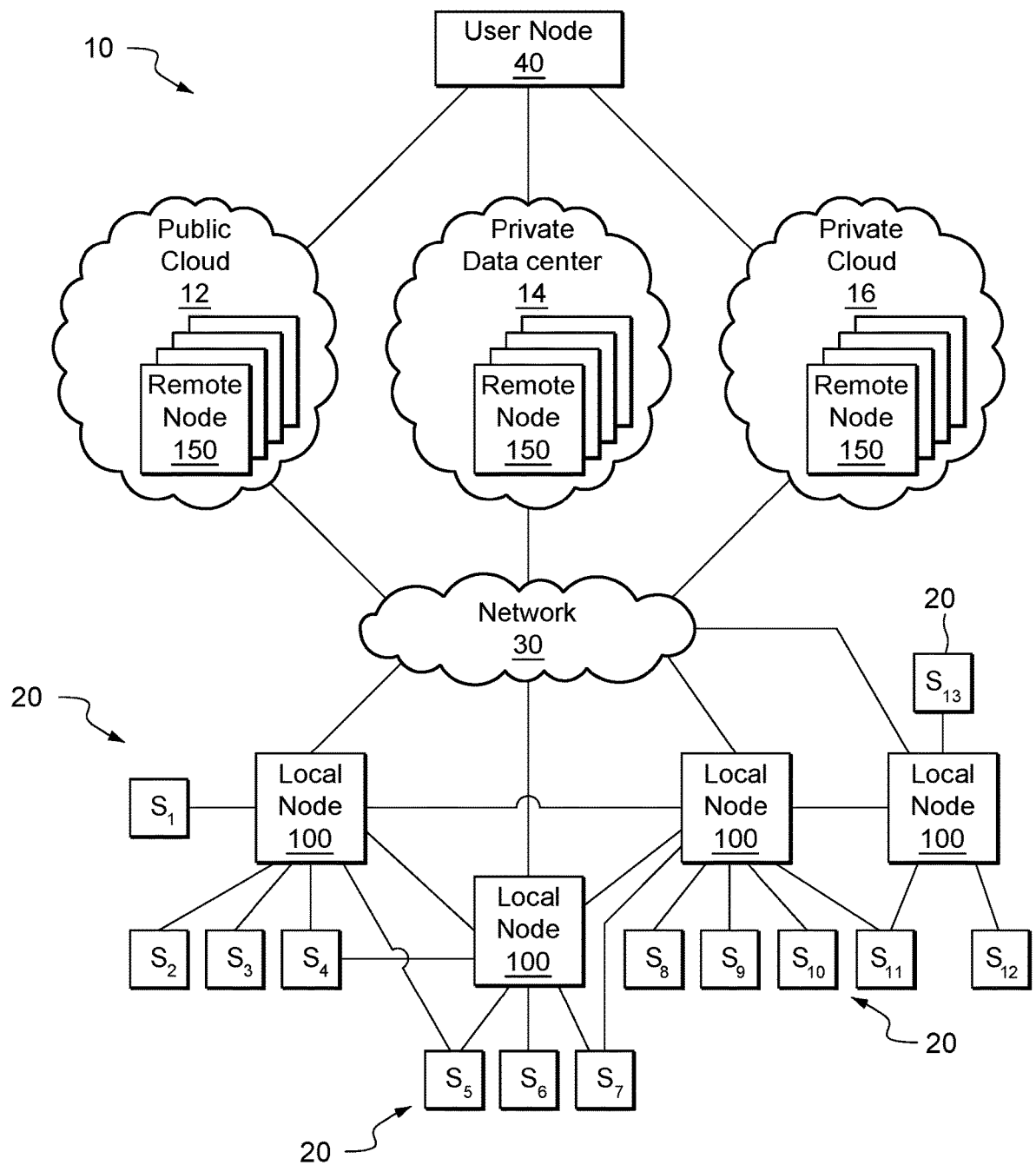
FIG. 1 is a diagram of a system including a plurality of sensors, a plurality of local nodes, and a plurality of remote nodes.

One embodiment provides a computer program product comprising non-transitory computer readable storage media having program instructions embodied therewith. The program instructions are executable by a processor to receive a continuous query for a user application and receive unfiltered sensor data transmitted over a network from a local compute node that is operatively coupled to a plurality of sensors, wherein the sensor data includes data obtained from the plurality of sensors. The program instructions are further executable by the processor to identify one or more principal components of the sensor data that are responsive to the continuous query, instruct the local compute node to continue transmitting only the sensor data that has been identified as the one or more principal components, and provide the user application with the sensor data that has been identified as the one or more principal components.

Embodiments address the problem of collecting and analyzing large volumes of data obtained from a plurality of sensors with limited resources, such as a limited amount of processor capacity, a limited data storage capacity, and/or a limited communication bandwidth. For example, in a system monitoring application or process control application, including applications referred to as the Internet of Things (IoT), data from the plurality of sensors may be collected on an ongoing basis over an extended period of time, such as a continuous stream of sensor data that is collected over an indefinite period of time.

In a preferred embodiment, the processor for executing the program instructions is part of a compute node that is not directly coupled to the plurality of sensors. For example, the compute node including the processor for executing the program instructions may be referred to as a remote compute node and may be coupled to the local compute node over a dedicated communication connection or over a communication network, such as a local area network (LAN) or a wide area network (WAN). The remote compute node may be a dedicated management node, but the remote compute node may also be a compute node in a datacenter or cloud computing environment. Accordingly, the analytics may occur in a datacenter or cloud environment. Furthermore, the local and remote compute nodes may be multi-processor nodes, where references to "a processor" should be read to mean "at least one processor."

Embodiments of the user application may be or include aspects of a data stream management system (DSMS). Furthermore, the continuous query may be formulated in various ways, such as using Continuous Query Language (CQL), StreamSQL and complex event processing (CEP) languages. Optionally, the user application may be performed on a user compute node separate from the local and remote compute nodes, but may also be performed on the local or remote compute nodes if there is sufficient resources available. The user application may be performed on a compute node in a datacenter or a cloud computing environment.

The plurality of sensors may include any one or more type of sensor presently known or developed in the future. A non-limiting list of sensor types include acoustic or vibration sensors, electrical current sensors, thermal sensors, humidity sensors, fluid flow sensors, optical sensors, pressure or force sensors, level sensors, proximity sensors, presence or position sensors, and chemical sensors. Other types of sensors may also be used. Furthermore, embodiments may include any of the various different technologies that may be used to implement these sensors, and the sensors may include additional circuits and devices used to form, condition, amplify or transmit signals to the local compute node.

The one or more principal components of the sensor data that are responsive to the continuous query may be identified using any one or more analytics process, and the one or more analytics process may change over time. One example includes principal component analysis (PCA), which is a statistical procedure that uses an orthogonal transformation to convert a set of observations of possibly correlated variables into a set of values of linearly uncorrelated variables called principal components. Other statistical analysis that identifies a correlation, dependence or association between certain components of the sensor data and the continuous query may also be used. Unfiltered sensor data is initially or periodically received and used for the purpose of performing the statistical analysis to identify one or more principal component of the sensor data. Subsequently, the local compute node is instructed to continue transmitting only the sensor data that has been identified as the one or more principal components. In this manner, the continuous query may be supplied with the data that is most relevant to the query. Transmitting only the identified one or more principal components of the sensor data uses less bandwidth on the network than transmitting the unfiltered sensor data obtained from the plurality of sensors.

In a further embodiment, the program instructions are further executable by the processor to periodically identify a new set of one or more principal components of the sensor data. For example, the program instructions may be executable by the processor to instruct the local compute node to transmit unfiltered sensor data, update the identified one or more principal components of the sensor data using the most recently receive unfiltered sensor data, and instruct the local compute node to continue transmitting only the updated one or more principal components of the sensor data. Specifically, the updated one or more principal components of the sensor data may include a new principal component that was not included in the previous one or more principal components and/or may exclude sensor data that was included in the previous one or more principal components. The principal components may be updated on a schedule or in response to an event or condition. In one option, the new set of one or more principal components of the sensor data is periodically identified in response to detecting a drift in accuracy of a query result using a current set of the one or more principal components.

In one option, the program instructions may be further executable by the processor to determine, for each of the plurality of sensors, a data collection rate that will provide a predetermined amount of application accuracy. The local compute node may then be instructed to collect data from each of the plurality of sensors at the data collection rate determined for each of the plurality of sensors. Reducing the data collection rate in a manner that preserves a predetermined amount of application accuracy is one way to effectively reduce the consumption of resources.

In another option, the program instructions may be further executable by a processor to determine, for each of the one or more principal components of the sensor data, a data transmission rate that will provide a predetermined amount of application accuracy without exceeding an allocated amount of network bandwidth. The local compute node may then be instructed to transmit the one or more principal components of the sensor data at the data transmission rate determined for each of the one or more principal components of the sensor data. Controlling the data transmission rate for each principal component of the sensor data in a manner that preserves a predetermined amount of application accuracy is another way to effectively reduce the consumption of resources.

In yet another option, the program instructions may be further executable by the processor to determine an amount of network bandwidth allocated for transmission of sensor data between the local compute node and a computing system that includes the processor. The local compute node may then be instructed to transmit the one or more principal components of the sensor data at the greatest transmission rate that will not exceed the allocated amount of network bandwidth. In this manner, the local node provides only the principal components of the sensor data, and provides this data at the greatest transmission rate possible without exceeding the allocated amount of network bandwidth. In one simple example, if the continuous query requests the current location of an automobile and the network bandwidth is constrained, the local compute node may be instructed to only transmit an x-coordinate (latitude) and a y-coordinate (longitude) and not transmit a z-coordinate (elevation). Eliminating the z-coordinate (elevation) from the transmitted data may achieve a 33% reduction in bandwidth consumed.

In a still further option, the program instructions may be further executable by the processor to determine an amount of data storage allocated to the local compute node for storage of the collected sensor data. The local compute node may then be instructed to temporarily store the unfiltered sensor data for a trailing period of time since collection of the unfiltered sensor data without exceeding the allocated amount of data storage. Since the unfiltered sensor data is used only periodically to determine an updated set of principal components of the sensor data, this option maintains as much of the most recent unfiltered data as possible. This data is made available to the analytics process whenever requested.

In other embodiments, the program instructions may be further executable by the processor to determine, for each of the principal components of the sensor data, a degree of precision that is designated by the continuous query. The local compute node may then be instructed to transmit and/or store the one or more principal components of the sensor data with no more than the designated degree of precision. For example, the designated degree of precision may be a number of significant digits or an indication of a least significant digit or decimal place. In another example, a hash function may be applied to any raw sensor data to arrive at a categorized value. In a specific implementation, assuming that a light sensor that returns the wavelength of light, it is possible to adjust the precision of the data by grouping any wavelength in the range of 635-700 nm as being "red" and simply assign a shorthand value of "1" for "red" if the continuous query only cares about a spectrum of 7 color bands of the rainbow. Reducing the precision of the data in any of these ways at the local compute node, rather than through processing by the analytics process, may reduce the volume of data transmitted between the local and remote nodes so as to reduce the amount of bandwidth required. Similarly, reducing the precision of the data at the local compute node may reduce the volume of data stored by the local nodes so as to reduce the amount of data storage required.

Although a principal component of the sensor data may be the data obtained from a single sensor, embodiments may identify a principal component of the sensor data that is a composite value calculated with sensor data from more than one of the plurality of sensors. For example, the program instructions may be further executable by a processor to identify a composite value of two or more of the principal components that will be used by the continuous query. The local compute node may then be instructed to computationally transform the two or more of the principal components, or the data from two or more sensors, into the composite value before the local compute node transmits the sensor data. Preferably, transmitting the composite value may use less bandwidth on the network than separately transmitting the sensor data from the two or more principal components. In essence, it may take less bandwidth to transmit one composite value instead of transmitting two separate sensor values.

Another embodiment provides an apparatus, such as a compute node, comprising at least one storage device for storing program instructions and at least one processor for executing the program instructions. The program instructions are executable by the processor to receive a continuous query for a user application and receive unfiltered sensor data transmitted over a network from a local compute node that is operatively coupled to a plurality of sensors, wherein the sensor data includes data obtained from the plurality of sensors. The program instructions are further executable by the processor to identify one or more principal components of the sensor data that are responsive to the continuous query, instruct the local compute node to continue transmitting only the sensor data that has been identified as the one or more principal components, and provide the user application with the sensor data that has been identified as the one or more principal components.

The foregoing apparatus may further store program instructions for implementing or initiating any one or more embodiments of the computer program products described herein. Accordingly, a separate description of the computer program product will not be duplicated in the context of the apparatus embodiments.

FIG. 1 is a diagram of a system 10 including a plurality of sensors 20, a plurality of local nodes 100, and a plurality of remote nodes 150. Each of the plurality of sensors 20 is connected to one or more of the local nodes 100. In operation, one or more of the local nodes 100 collect data from each of the sensors 20. A local node 100 is preferably in close proximity to the sensors to which it is connected, but that is not a requirement. Furthermore, the local node 100 is preferably a hub for collection of data from multiple sensors 20 and facilitates handling and transmission of sensor data to one or more of the remote nodes 150.

A local node 100 may or may not be interconnected with one or more of the other local nodes 100, if any are present in the system. Accordingly, one local node 100 may share sensor data via an interconnection, such as a local area network. Furthermore, one or more of the local nodes 100 may be connected to a network 30, such as a wide area network which may include the Internet.

A local node 100 may transmit sensor data over the network 30 to one or more remote node 150 for analysis. A remote node 150 may, for example, be one or more nodes in a public cloud 12, a private datacenter 14, or a private cloud 16. Preferably, the local node 100 only transmits principal components of the sensor data that the remote node 150 has instructed the local node 100 to transmit. However, a remote node 150 may request principal components of the sensor data from multiple local nodes 100, and multiple remote nodes 150 may request principal components of the sensor data from any one or more of the local nodes 100. According to various embodiments, a remote node 150 may instruct a local node 100 to limit the amount of bandwidth used to transmit the sensor day, limit a data collection or transmission rate, or limit the precision of data transmitted or stored.

A remote node 150 preferably identifies principal components of the sensor data that are responsive to a continuous query received from a user node 40, which may be running a user application such as a data stream management system using a continuous query language. Accordingly, the remote node may then request that one or more of the local nodes 100 provide only the identified principal components of the sensor data on an ongoing or continuous basis. Still, the local nodes 100 may store recent unfiltered sensor data in order to periodically provide the unfiltered sensor data to the remote node 150 for analysis to update the principal components of the sensor data.

Figure 2:
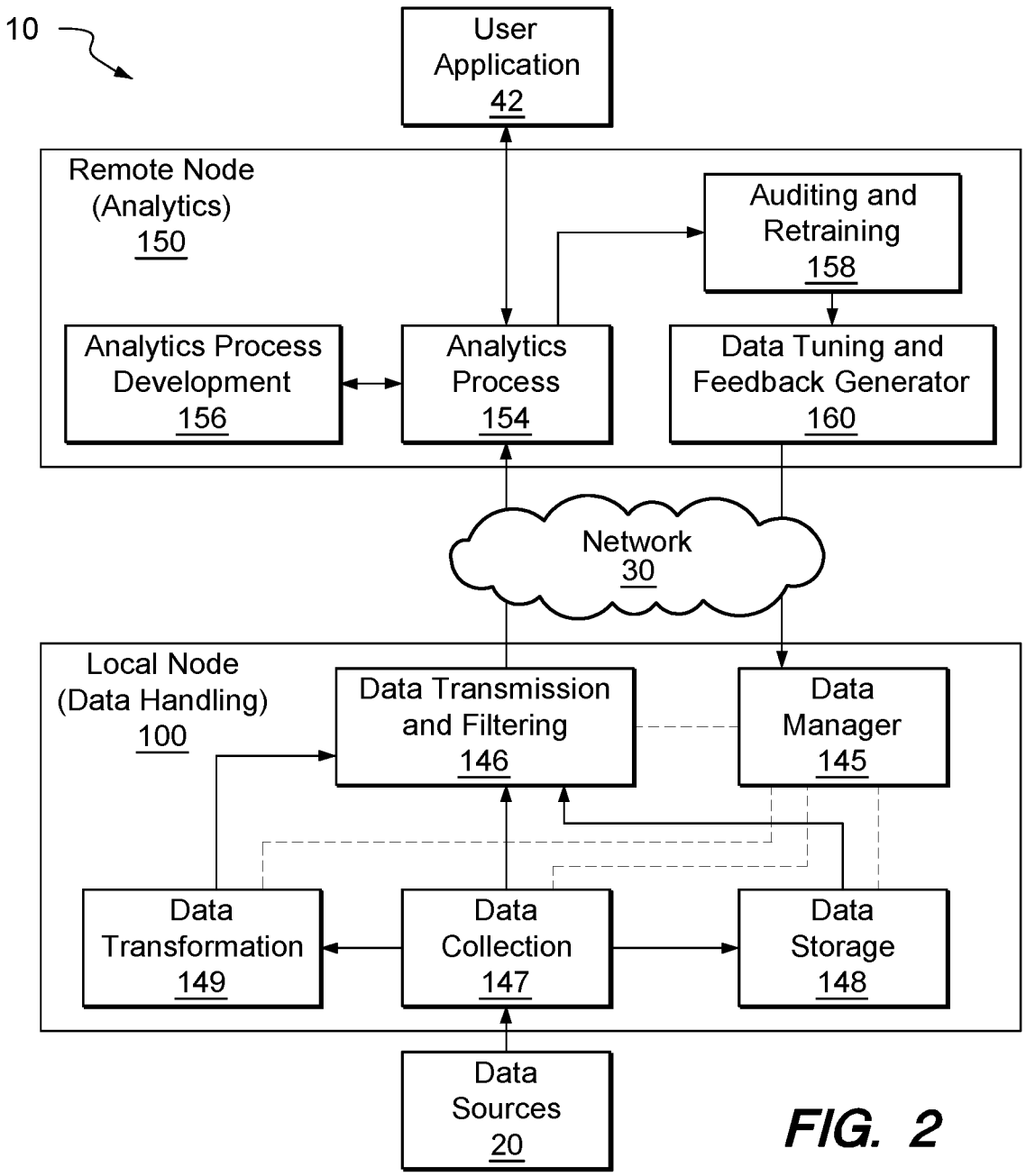
FIG. 2 is a diagram of a system including a local node and a remote node.

FIG. 2 is a diagram of the system 10 including a local node 100 and a remote node 150 in communication over the network 30. The local node 100 collects sensor data from the data sources or sensors 20 and provides principal components of the sensor data to the remote node 150 as instructed by the remote node 150. Ultimately, the remote node 150 uses the principal components of the sensor data that are responsive to a continuous query received from a user application 42.

The local node 100 is illustrated with various logic modules that are representative of the functions carried out by hardware and/or software. A data collection module 147 receives and collects sensor data from any number of data sources or sensors 20. The data collection module 147 provides the sensor data to a data storage device 148 for storage of sensor data, to a data transmission and filtering module 146, and may also provide some or all of the sensor data to a data transformation module 149. For example, the data transformation module 149 may obtain sensor data from the data collection module 147, calculate a composite value based on data from two or more sensors, and provide the composite value to the data transmission and filtering module 146. The data transmission and filtering module 146 transmits principal components of the sensor data over the network 30 to the remote node 150. A data manager module 145 receives instructions from the remote node 150 and uses those instructions to control the operation of one or more of the other modules 146, 147, 148, 149.

The remote node 150 receives sensor data from the local node 100 as input to the analytics process module 154. As previously discussed, the analytics process module 154 may include various statistical analysis, such as principal component analysis, to identify a correlation, dependence or association between certain components of the sensor data relative to a continuous query received from the user application 42. The exact statistical analysis may be selected or developed, over time, by an analytics process development module 156. For example, the analytics process development module 156 may compare the accuracy of the query results as a function of the type of statistical analysis that was used to identify the principal components of the sensor data. The fundamental purpose of the analytics process module 154 is to identify what portion of the sensor data is important to the continuous query and what portion of the sensor data is not important to the continuous query.

Unfiltered sensor data may be initially and/or periodically received by the analytics process module 154 and used for the purpose of performing the statistical analysis that identifies one or more principal component of the sensor data. An auditing and retraining module 158 may audit the accuracy of the query results based on the currently-selected principal components of the sensor data. If there is an accuracy drift, i.e., the degree of error is increasing, then the auditing and retraining module 158 may identify a change in the principal components and communicate this change to the data tuning and feedback generator module 160. The data tuning and feedback generator module 160 then transmits an instruction to the data manager 145 instructing the data manager 145 to effect changes in how the modules 146, 147, 148, 149 are operating.

For example, the data manager 145 may implement the instruction to cause the data transmission and filtering module 146 to forward only an updated set of principal component data to the analytics process 154. This change may be implemented either to increase the accuracy of the query result or to reduce an amount of network bandwidth consumed by transmitting the sensor data from the local node 100 to the remote node 150. Furthermore, the data manager 145 may implement the instruction to cause the data collection module 147 to change an interval at which sensor data is collected from one or more of the sensors. Still further, the data manager 145 may implement the instruction to cause the data collection module 147 or the data transmission and filtering module 146 to completely filter out data from a specific sensor or a specific type of sensor. In another example, the data manager 145 may implement the instruction to cause the data transformation module 149 to calculate a new composite value or to cause the data storage module 148 to adjust the manner in which it stores sensor data. Various embodiments previously disclosed may be implemented via an instruction from the data tuning and feedback generator module 160 to the data manager 145.

Still, the data storage module 148 may cause a data storage device on the local node 100 to maintain a full/unfiltered data set of the most recent sensor data, including the previously identified principal component sensor data as well as sensor data that has not been identified as a principal component. In one option, the oldest sensor data in this local cache may be purged in the order it was received (i.e., first-in first-out). However, maintaining a recent history of the full data set allows the analytics application to periodically perform an updated analysis to identify the principal components of the sensor data. For example, whereas the data from one or more sensors may be initially found to be a principal component, a subsequently analysis may identify that the data from a different sensor or some different combination of sensors may be the principal components. Accordingly, local data filtering may be modified over time to optimize the efficiency of the system.

Periodically, this unfiltered data may be uploaded to the remote node 150 and re-analyzed for changes in the principal components or for the development of new analysis engines for the analytics application. For example, the sensor data may be uploaded and re-analyzed on a regular schedule or in response to some event or condition. This re-analysis may be performed separate from the normal analytics process flow. In one option, the unfiltered sensor data may be re-analyzed in response to detecting a drift in accuracy of the previously selected principal components, which may be discovered via an occasional auditing of a full set of data components. Auditing may also be done periodically, either on a schedule or at the discretion of an administrator. A scheduled period for re-analysis may vary according to the problem domain and the capacity of a data storage device of the local node 100.

A change in the principal components may mean that the analytics application selects a different data source as the principal component data. However, where the available set of data sources is fixed in scope, a change in the principal components may mean that a previously-excluded data feed is re-included or a new composite value of existing sensor data is employed to better filter the signal out.

One potential benefit of periodically re-analyzing the unfiltered data to identify updated principal components is that data transmission between the local and remote nodes may be reduced without loss of analysis accuracy. Furthermore, additional analysis algorithms may be developed during the active lifetime of the sensor network. The analytics process may use various "analysis engines", including, but not limited to, principal component analysis (PCA) or machine learning. At any point in time, the analytics process may implement any one or more of these analysis engines. Furthermore, a new analysis engine may be discovered, developed, or implemented from time to time by system engineers or programmers.

The data transmission and filtering module 146 of the local node 100 may be controlled by the remote node 150 via the data manager 145. Accordingly, the system is able to make a tradeoff between accuracy of the query result and consumption of resources in order to reduce network bandwidth consumption or computational load, optionally to meet network bandwidth or computational load limitations. In an environment where the network is constrained, the analytics process may determine the most important data elements among the principal component data (i.e., the "principal principals") to prevent the amount of data from exceeding a constrained data transmission budget between the local node(s) and the remote node(s). Adjustments in the performance of the local node 100, such as data transmission, data retention and data transformation, may be made dynamically and automatically by the remote node 150.

Figure 3:
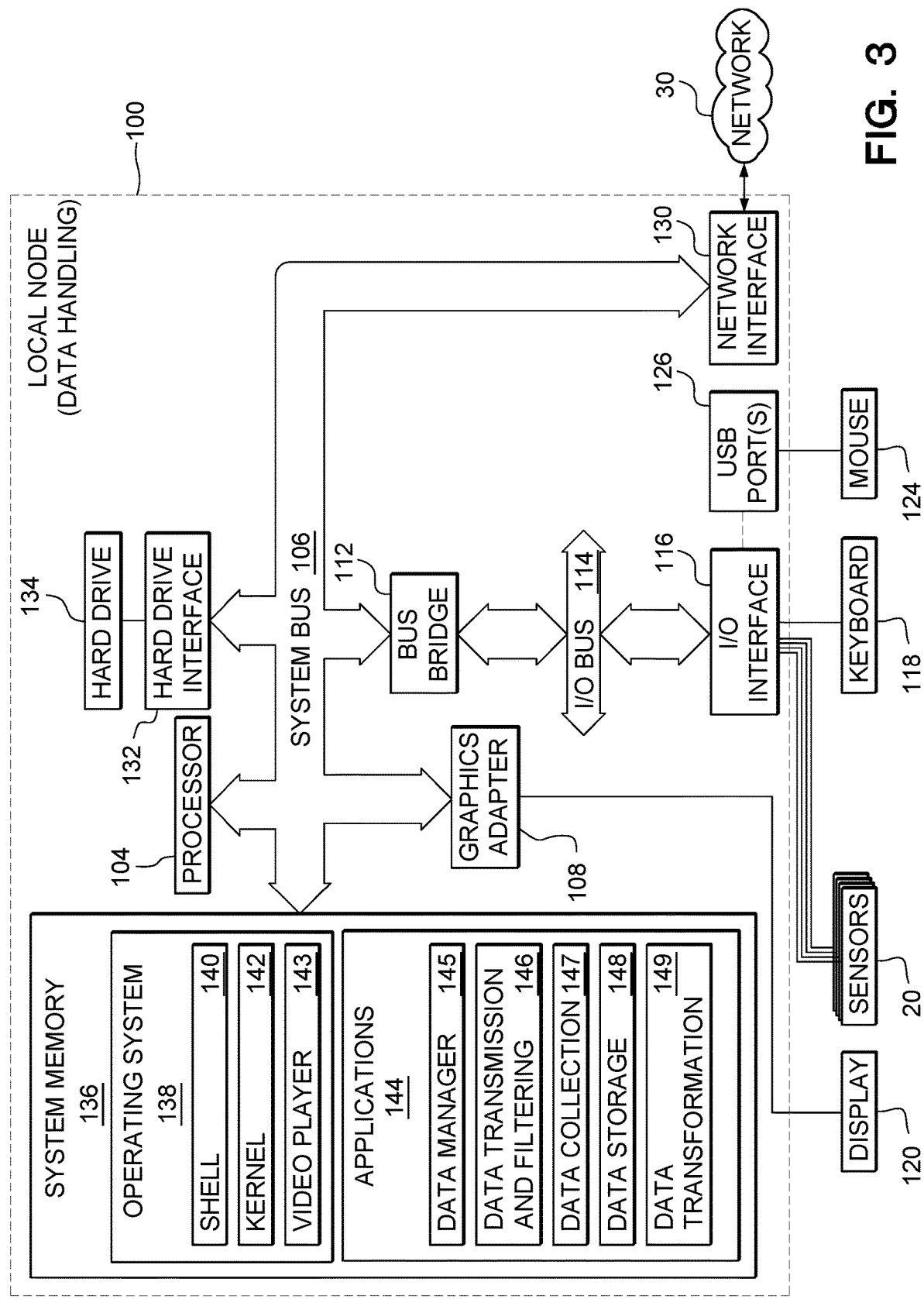
FIG. 3 is a diagram of a local node for collecting data from a plurality of sensors.

FIG. 3 is a diagram of a computer 100 that is representative of one embodiment of the local node 100 of FIGS. 1 and 2. The computer 100 includes a processor unit 104 that is coupled to a system bus 106. The processor unit 104 may utilize one or more processors, each of which has one or more processor cores. A graphics adapter 108, which drives/supports a display 120, may also be coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including the plurality of sensors 20 and optionally including a keyboard 118, and a USB mouse 124 (or other type of pointing device) via USB port(s) 126. As depicted, the computer 100 is able to communicate with other network devices over the network 30 using a network adapter or network interface controller 130. Specifically, the local node 100 may transmit sensor data to the remote node via the network interface 130 and the network 30 and receive instructions from the remote node via the network interface and the network 30.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory includes additional higher levels of volatile memory (not shown), including, but not limited to, cache memory, registers and buffers. Data that populates the system memory 136 includes the operating system (OS) 138 and application programs 144.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 may be a text-based, line-oriented user interface, the present invention may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144. Such essential services may include memory management, process and task management, disk management, and mouse and keyboard management.

As shown, the computer 100 includes application programs 144 in the system memory of the computer 100, including, for example, a data manager module 145, a data transmission and filtering module 146, a data collection module 147, a data storage module 148, and a data transformation module 149 for implementing one or more embodiment. Optionally, one or more of these modules 145-149 may be included in the operating system 138.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the present invention.

Figure 4:
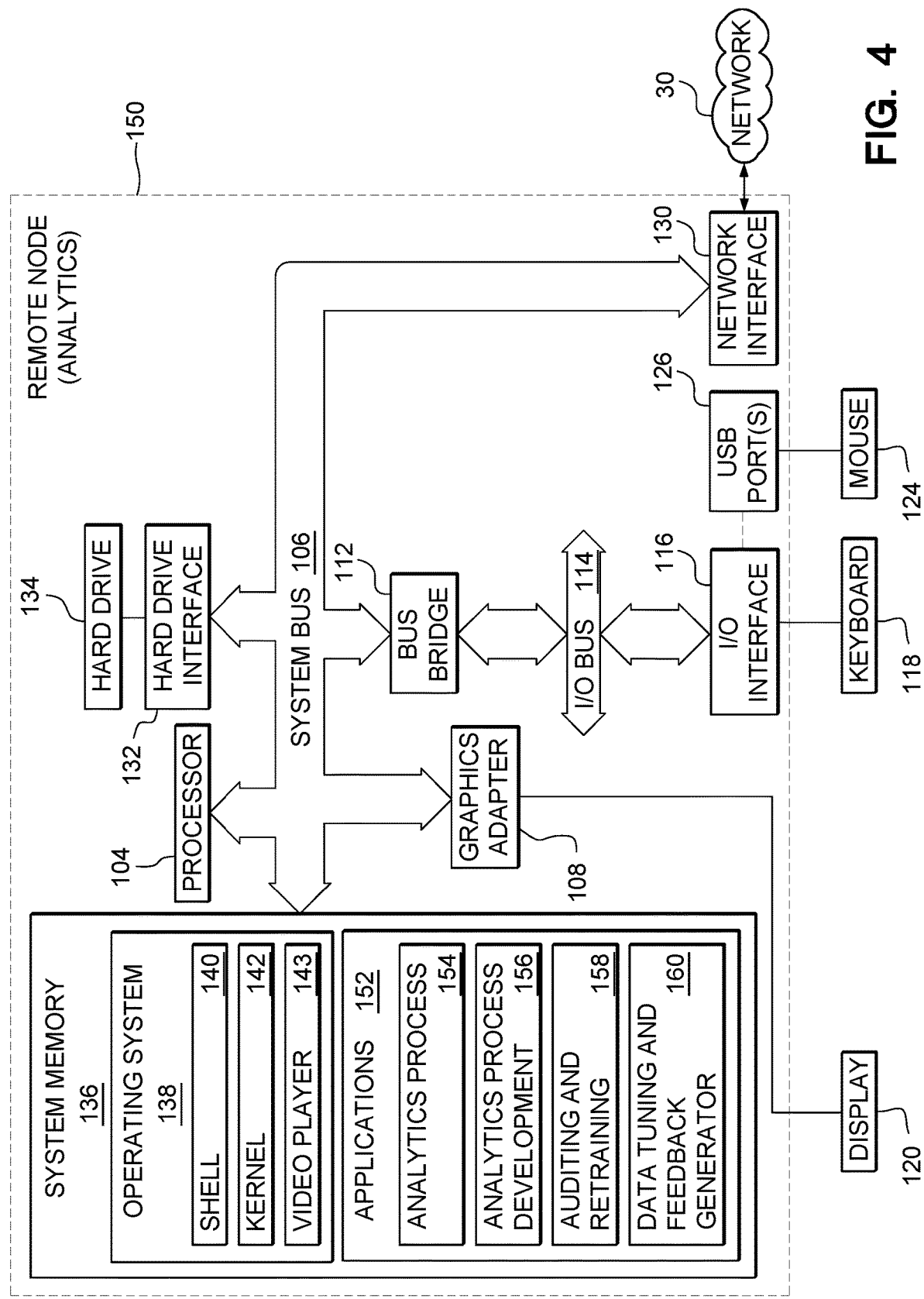
FIG. 4 is a diagram of a remote node for performing an analytics process.

FIG. 4 is a diagram of a computer 150 that is representative of one embodiment of the remote node 150 of FIGS. 1 and 2. The hardware shown in this non-limiting example is illustrated as being the same as that of the local node 100 in FIG. 3, such that like components are labeled with the same reference numbers. However, the I/O interface 116 of the remote node 150 is not coupled to the sensors 20 (See FIGS. 1-3).

The computer 150 includes application programs 144 in the system memory 136, including, for example, an analytics process module 154, an analytics process development module 156, an auditing and retraining module 158, and a data turning and feedback generator module 160. The remote node 150 may receive principal component sensor data from the local node via the network interface 130 and the network 30 and send instructions to the local node via the network interface 130 and the network 30.

Figure 5:
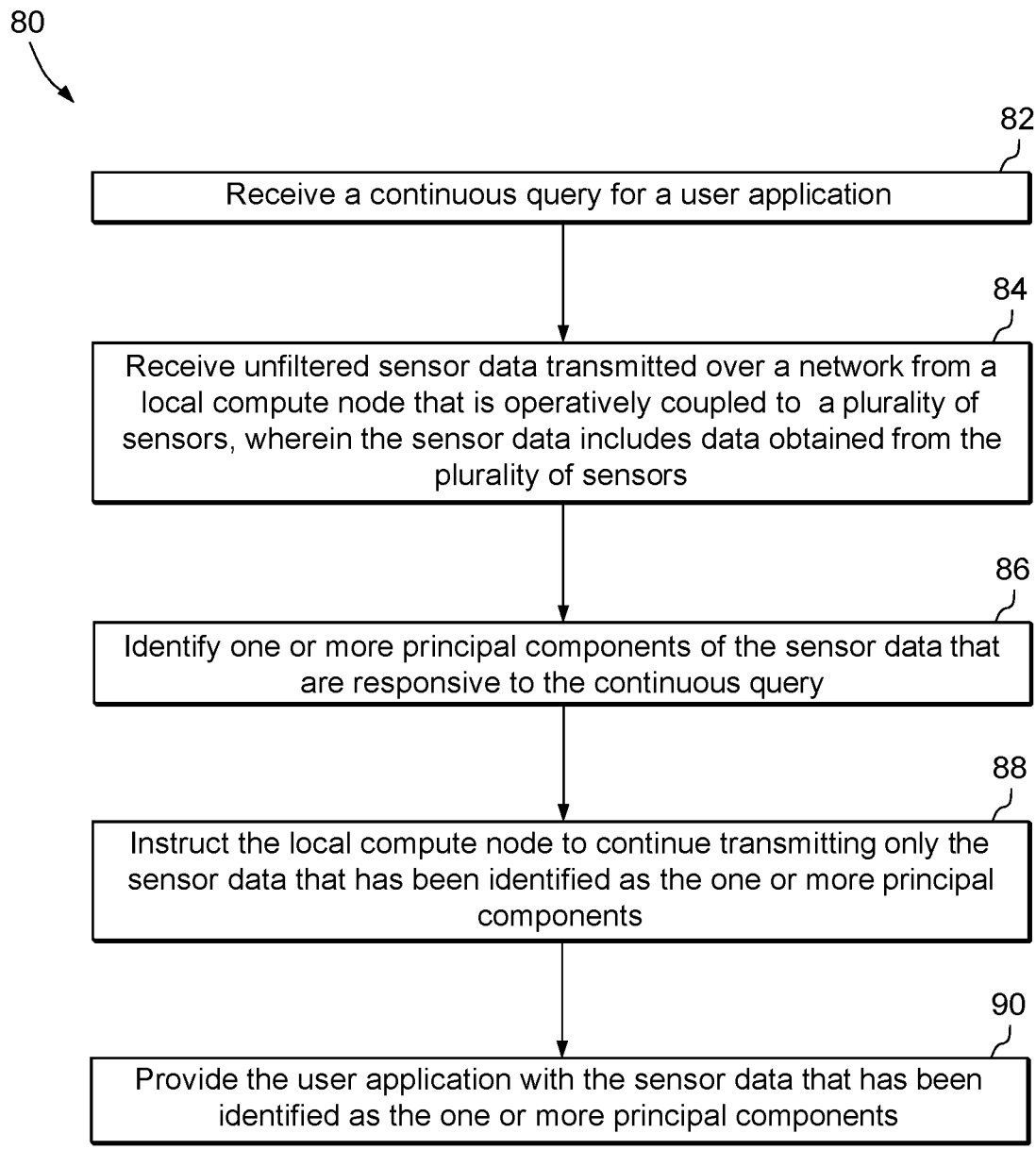
FIG. 5 is a flowchart of program instructions that may be executed by a processor of the remote node.

FIG. 5 is a flowchart of program instructions 80 that may be executed by a processor of the remote node. Program instructions 82 are executed by the processor to receive a continuous query for a user application. Program instructions 84 are executed by the processor to receive unfiltered sensor data transmitted over a network from a local compute node that is operatively coupled to a plurality of sensors, wherein the sensor data includes data obtained from the plurality of sensors. Program instructions 86 are executed by the processor to identify one or more principal components of the sensor data that are responsive to the continuous query. Program instructions 88 are executed by the processor to instruct the local compute node to continue transmitting only the sensor data that has been identified as the one or more principal components. Program instructions 90 are executed by the processor to provide the user application with the sensor data that has been identified as the one or more principal components.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising non-transitory computer readable storage media having program instructions embodied therewith, the program instructions executable by a processor to:
   receive a continuous query for a user application;
   receive unfiltered sensor data transmitted over a network from a local compute node that is operatively coupled to a plurality of sensors, wherein the sensor data includes data obtained from the plurality of sensors;
   identify one or more principal components of the sensor data that are responsive to the continuous query;
   instruct the local compute node to continue transmitting only the sensor data that has been identified as the one or more principal components; and
   provide the user application with the sensor data that has been identified as the one or more principal components.

2. The computer program product of claim 1, wherein transmitting only the identified one or more principal components of the sensor data uses less bandwidth on the network than transmitting the unfiltered sensor data obtained from the plurality of sensors.

3. The computer program product of claim 1, wherein the program instructions are further executable by the processor to periodically identify a new set of one or more principal components of the sensor data.

4. The computer program product of claim 3, wherein the program instructions further executable by the processor to periodically identify a new set of one or more principal components of the sensor data, includes program instructions executable by the processor to:
   instruct the local compute node to transmit unfiltered sensor data;
   update the identified one or more principal components of the sensor data using the most recently receive unfiltered sensor data; and
   instruct the local compute node to continue transmitting only the updated one or more principal components of the sensor data.

5. The computer program product of claim 4, wherein the updated one or more principal components of the sensor data either includes a new principal component that was not included in the previous one or more principal components or excludes sensor data that was included in the previous one or more principal components.

6. The computer program product of claim 4, wherein the new set of one or more principal components of the sensor data is periodically identified in response to detecting a drift in accuracy of a query result using a current set of the one or more principal components.

7. The computer program product of claim 1, wherein the program instructions are further executable by a processor to:

determine, for each of the plurality of sensors, a data collection rate that will provide a predetermined amount of application accuracy based upon the periodic identification of principal components; and instruct the local compute node to collect data from each of the plurality of sensors at the data collection rate determined for each of the plurality of sensors.

8. The computer program product of claim 1, wherein the program instructions are further executable by a processor to:

determine, for each of the one or more principal components of the sensor data, a data transmission rate that will provide a predetermined amount of application accuracy without exceeding an allocated amount of network bandwidth; and instruct the local compute node to transmit the one or more principal components of the sensor data at the data transmission rate determined for each of the one or more principal components of the sensor data.

9. The computer program product of claim 1, wherein the program instructions are further executable by the processor to:

determine an amount of network bandwidth allocated for transmission of sensor data between the local compute node and a computing system that includes the processor; and instruct the local compute node to transmit the one or more principal components of the sensor data at the greatest transmission rate that will not exceed the allocated amount of network bandwidth.

10. The computer program product of claim 1, wherein the program instructions are further executable by the processor to:

determine an amount of data storage allocated to the local compute node for storage of the collected sensor data; and instruct the local compute node to temporarily store the unfiltered sensor data for a trailing period of time since collection of the unfiltered sensor data without exceeding the allocated amount of data storage.

11. The computer program product of claim 1, wherein the program instructions are further executable by the processor to:

determine, for each of the principal components of the sensor data, a degree of precision that is designated by the continuous query; and instruct the local compute node to transmit the one or more principal components of the sensor data with no more than the designated degree of precision.

12. The computer program product of claim 11, wherein the designated degree of precision is a number of significant digits or an indication of a least significant digit.

13. The computer program product of claim 1, the program instructions executable by a processor to:

determine, for each of the principal components of the sensor data, a degree of precision that is designated by the continuous query; and instruct the local compute node to store the unfiltered sensor data with no more than the designated degree of precision.

14. The computer program product of claim 13, wherein the designated degree of precision is a number of significant digits or an indication of a least significant digit.

15. The computer program product of claim 1, wherein one or more principal components of the sensor data includes a composite value that is calculated with sensor data from more than one of the plurality of sensors.

16. The computer program product of claim 15, the program instructions executable by a processor to:

identify a composite value of two or more of the principal components that will be used by the continuous query; and instruct the local compute node to computationally transform the two or more of the principal components into the composite value before the local compute node transmits the sensor data, wherein transmitting the composite value uses less bandwidth on the network than separately transmitting the sensor data from the two or more principal component.

17. An apparatus, comprising:

at least one storage device for storing program instructions; and at least one processor for executing the program instructions to:

receive a continuous query for a user application;

receive unfiltered sensor data transmitted over a network from a local compute node that is operatively coupled to a plurality of sensors, wherein the sensor data includes data obtained from the plurality of sensors;

identify one or more principal components of the sensor data that are responsive to the continuous query;

instruct the local compute node to continue transmitting only the sensor data that has been identified as the one or more principal components; and provide the user application with the sensor data that has been identified as the one or more principal components.

18. The apparatus of claim 17, wherein the program instructions are further executable by the processor to periodically identify a new set of one or more principal components of the sensor data, wherein the program instructions further executable by the processor to periodically identify a new set of one or more principal components of the sensor data, include program instructions executable by the processor to:

instruct the local compute node to transmit unfiltered sensor data;

update the identified one or more principal components of the sensor data using the most recently receive unfiltered sensor data; and instruct the local compute node to continue transmitting only the updated one or more principal components of the sensor data.

19. The apparatus of claim 17, wherein the program instructions are further executable by the processor to:

determine an amount of network bandwidth allocated for transmission of sensor data between the local compute node and a computing system that includes the processor; and instruct the local compute node to transmit the one or more principal components of the sensor data at the greatest transmission rate that will not exceed the allocated amount of network bandwidth.

* * * * *